US 9,247,602 B2

(12) United States Patent
Takahashi et al.

(10) Patent No.: US 9,247,602 B2
(45) Date of Patent: Jan. 26, 2016

(54) LAMP AND ILLUMINATION APPARATUS

(71) Applicant: PANASONIC INTELLECTUAL PROPERTY MANAGEMENT CO., LTD., Osaka (JP)

(72) Inventors: Akira Takahashi, Osaka (JP); Kazuhiro Takeda, Osaka (JP); Toshiaki Isogai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/617,106

(22) Filed: Feb. 9, 2015

(65) Prior Publication Data

US 2015/0237698 A1 Aug. 20, 2015

(30) Foreign Application Priority Data

Feb. 14, 2014 (JP) ................................. 2014-026058

(51) Int. Cl.
*H05B 33/08* (2006.01)

(52) U.S. Cl.
CPC ........ *H05B 33/0845* (2013.01); *H05B 33/0815* (2013.01)

(58) Field of Classification Search
CPC ................................................. H05B 33/0833
USPC .......... 315/185 R, 209 R, 219, 307, 308, 360, 315/362
See application file for complete search history.

(56) References Cited

U.S. PATENT DOCUMENTS

| 6,281,636 | B1 * | 8/2001 | Okutsu et al. ............. 315/209 R |
| 8,449,154 | B2 | 5/2013 | Uemoto et al. |
| 2009/0033245 | A1 * | 2/2009 | Tsai et al. ..................... 315/291 |
| 2010/0308749 | A1 * | 12/2010 | Liu ............................... 315/307 |
| 2011/0109249 | A1 * | 5/2011 | Liu et al. ...................... 315/307 |
| 2012/0229052 | A1 * | 9/2012 | Yang et al. .................... 315/362 |
| 2012/0262070 | A1 * | 10/2012 | Oshima et al. ................ 315/130 |
| 2013/0278160 | A1 * | 10/2013 | Wu ........................... 315/200 R |
| 2014/0015416 | A1 * | 1/2014 | Somogyvari et al. ......... 315/151 |
| 2014/0312776 | A1 * | 10/2014 | Park et al. ..................... 315/129 |

FOREIGN PATENT DOCUMENTS

| JP | 2012-054213 | 3/2012 |
| JP | 2012-155975 | 8/2012 |
| WO | 2011/039998 | 4/2011 |

* cited by examiner

*Primary Examiner* — Thuy Vinh Tran
*Assistant Examiner* — Pedro C Fernandez
(74) *Attorney, Agent, or Firm* — Greenblum & Bernstein, P.L.C.

(57) ABSTRACT

An LED lamp is used being connected to an external switch for performing an ON-OFF operation. The LED lamp, when causing a light emitting module to emit light in a first lighting mode, controls a power supply circuit to cause the light emitting module to emit light at a first brightness for a predetermined time period from when a timer circuit is activated, and to cause the light emitting module to emit light at a second brightness lower than the first brightness, after passage of the predetermined time period. The LED lamp, when causing the light emitting module to emit light in a second lighting mode, controls the power supply circuit to cause the light emitting module to continue to emit light at the first brightness irrespective of a state of the timer circuit.

12 Claims, 14 Drawing Sheets

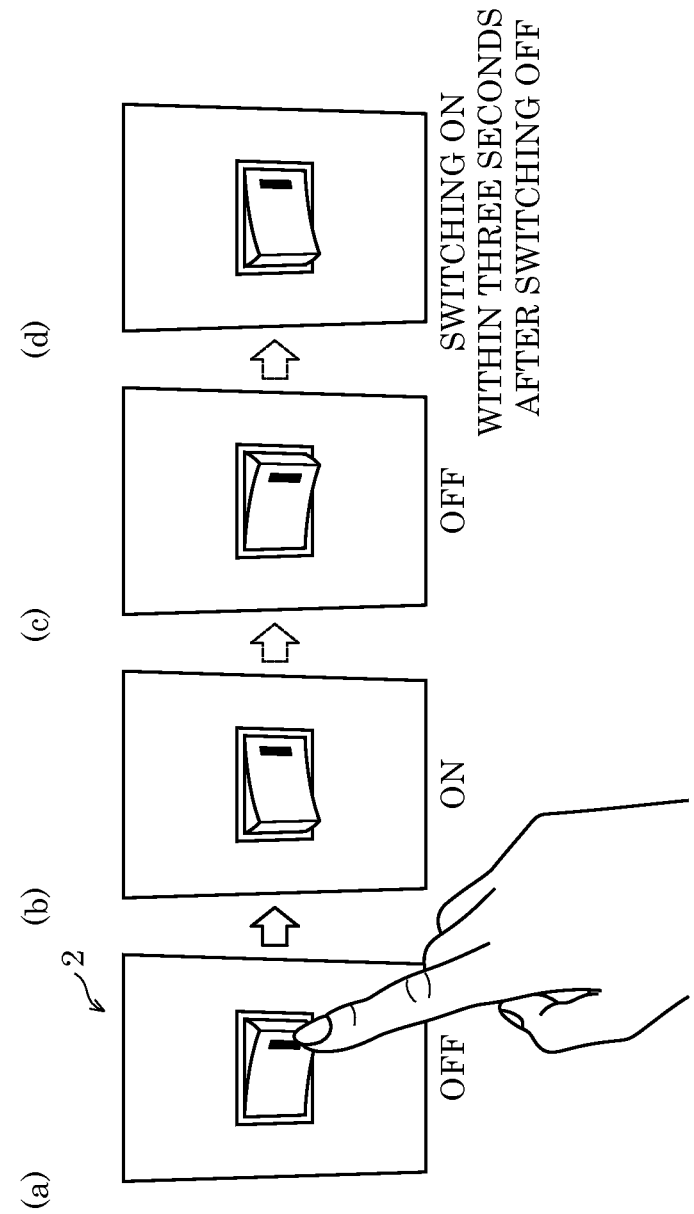

FIG. 6

| EXTERNAL SWITCH | LIGHTING MODE | SW01 | SW02 |
|---|---|---|---|
| OFF | OFF | — | — |
| ON | ENERGY-SAVING MODE | ON | OFF |
| SWITCHING ON WITHIN THREE SECONDS AFTER SWITCHING FROM ON TO OFF | NORMALLY-ON MODE | OFF | ON |

LAMP AND ILLUMINATION APPARATUS

BACKGROUND OF THE INVENTION

1. Field of the Invention

The present disclosure relates to an LED (Light Emitting Diode) lamp and an illumination apparatus.

2. Description of the Related Art

In recent years, an LED lamp has been proposed as a light bulb lamp which is a substitute for an incandescent lamp from the perspective of power saving. For example, International Publication No. 20011-039998 and Japanese Unexamined Patent Application Publication No. 2012-054213 each disclose an LED lamp. An LED module is employed as a light emitting module in the LED lamp.

For further power saving, an LED lamp disclosed by Japanese Unexamined Patent Application Publication No. 2012-155975, for example, includes a human sensor. This allows the LED lamp to be turned ON only when the human sensor detects a human, contributing to power saving.

SUMMARY OF THE INVENTION

An LED (Light Emitting Diode) lamp according to an aspect of the present disclosure is an LED lamp to be connected to an external switch for performing an ON-OFF operation. The LED lamp includes: a light emitting module; a power supply circuit which supplies a current to the light emitting module; a control circuit which determines whether to cause the light emitting module to emit light in a first lighting mode or to cause the light emitting module to emit light in a second lighting mode, based on the ON-OFF operation performed by the external switch, and controls the power supply circuit according to a result of the determination; and a timer circuit which is activated in an early stage of the first lighting mode. The control circuit, (i) in the first lighting mode, controls the power supply circuit to cause the light emitting module to emit light at a first brightness for a predetermined time period from when the timer circuit is activated, and to cause the light emitting module to emit light at a second brightness after passage of the predetermined time period, and (ii) in the second lighting mode, controls the power supply circuit to cause the light emitting module to continue to emit light at the first brightness irrespective of a state of the timer circuit, the second brightness being lower than the first brightness.

BRIEF DESCRIPTION OF DRAWINGS

FIG. 5 is a schematic diagram illustrating the state of an external switch of the LED illumination apparatus illustrated in FIG. 1, in which (a) OFF state, (b) ON state, (c) OFF state switched from the state (b), and (d) ON state switched within 3 seconds from the state (c) are illustrated;

FIG. 6 is a diagram illustrating a correspondence relationship in the ON/OFF state of the external switch, a lighting mode, and switches SW01 and SW02 in the control circuit, of the LED illumination apparatus illustrated in FIG. 1;

DETAILED DESCRIPTION OF THE PREFERRED EMBODIMENTS

Figure 14:
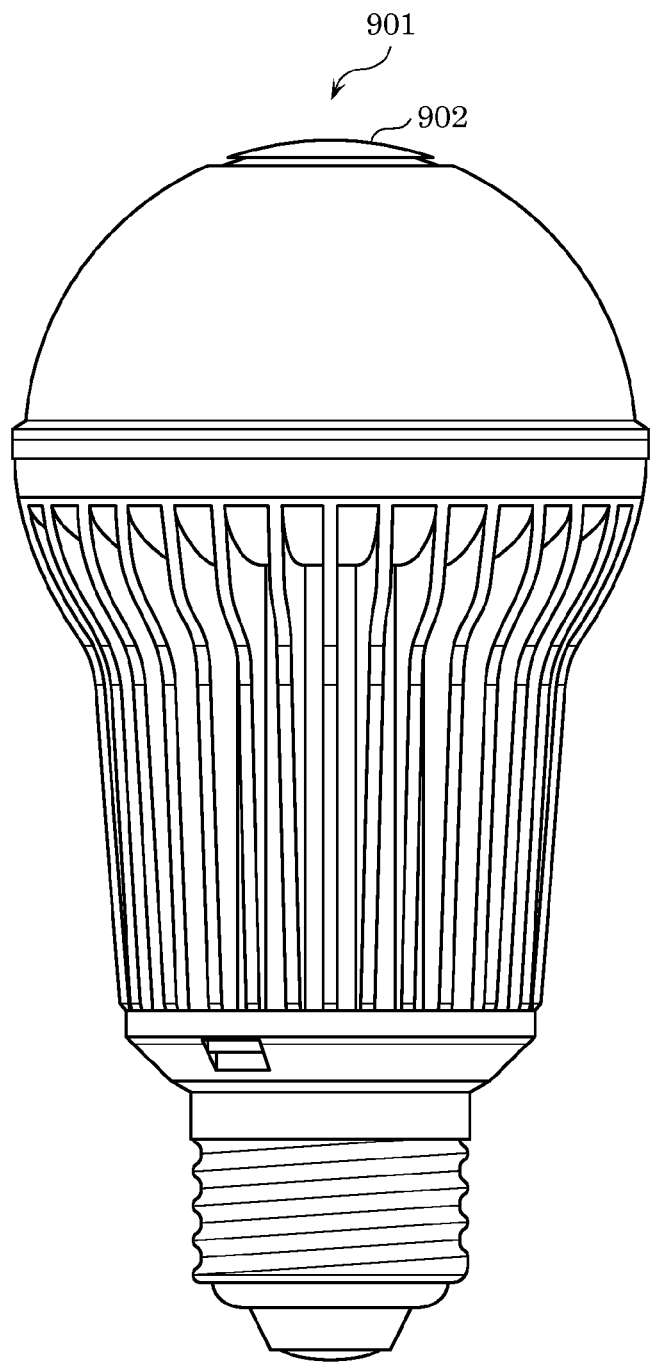
FIG. 14 is a schematic diagram illustrating an LED lamp according to a conventional technique.

Prior to a description of exemplary embodiments, a description is given of problems posed by LED lamps according to related techniques, with reference to FIG. 14. LED lamp 901 disclosed by Japanese Unexamined Patent Application Publication No. 2012-155975 includes a pyroelectric sensor as human sensor 902. The pyroelectric sensor detects a temporal change in specific infrared wavelengths. For that reason, human sensor 902 implemented by the pyroelectric sensor is incapable of detecting a human when the sensor is shielded by glass or a material other than a particular resin. In other words, human sensor 902 is incapable of detecting a human when attached to lighting equipment which covers LED lamp 901.

In addition, with LED lamp 901, an implementable lighting mode is only the lighting mode in which LED lamp 901 is tuned ON when a human is detected and turned OFF when the human is no longer detected. For example, there is the case where LED lamp 901 is caused to remain ON for a long time period after a first user passes through a hallway where LED lamp 901 is attached to the ceiling, for a second user who passes through the hallway next, and for indicating, for the second user, that the first user is already present in a room. Other than the above case, for example, not only switching modes between ON and OFF but also a mode in which light remains ON at the same brightness from when a user turns the light ON to when the light is turned OFF (hereinafter referred to as a normally-on mode) is required in some cases for security reasons. LED lamp 901 employing human sensor 902 is incapable of handling such a situation.

Exemplary embodiments according to the present disclosure will be described below with reference to the drawings. It should to be noted that each of the exemplary embodiments described below shows a preferable specific example. Thus, the numerical values, shapes, materials, constituent elements, the disposition and connection of the constituent elements, steps, the processing order of the steps, and others described in the following exemplary embodiments are mere examples, and do not intend to limit the present disclosure.

In addition, each of the diagrams is a schematic diagram and thus is not necessarily strictly illustrated. In each of the diagrams, substantially the same structural elements are assigned with the same reference signs, and redundant descriptions will be omitted or simplified.

[First Exemplary Embodiment]

Figure 1:
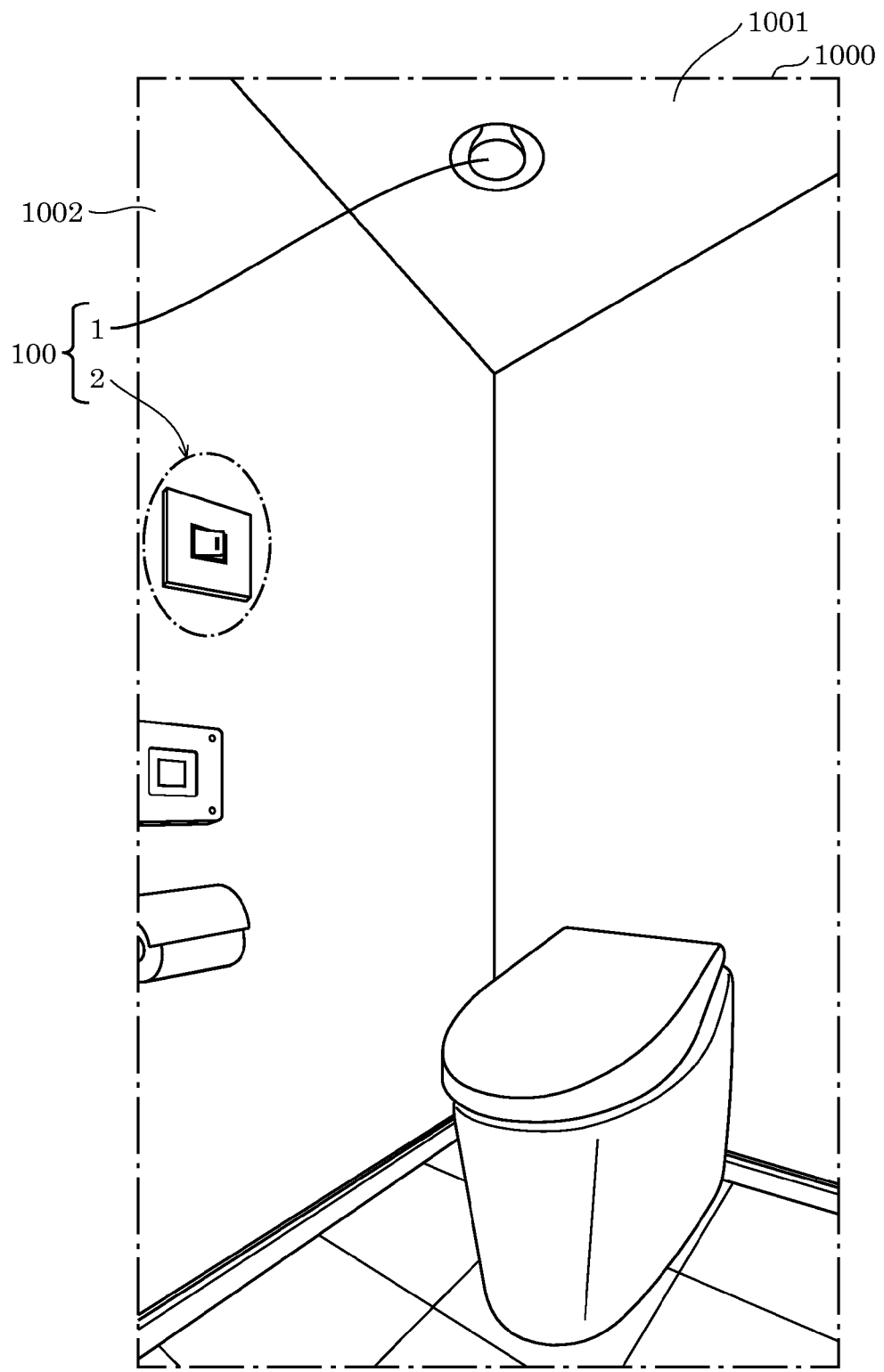
FIG. 1 is a schematic diagram illustrating an LED illumination apparatus according to a first exemplary embodiment.

FIG. 1 illustrates LED illumination apparatus 100 according to a first exemplary embodiment. LED illumination apparatus 100 is installed in toilet 1000. LED illumination apparatus 100 includes: LED lamp 1 provided on ceiling 1001 of toilet 1000; and external switch 2 provided on wall 1002 of toilet 1000.

[Configuration of LED Lamp 1]

Figure 2:
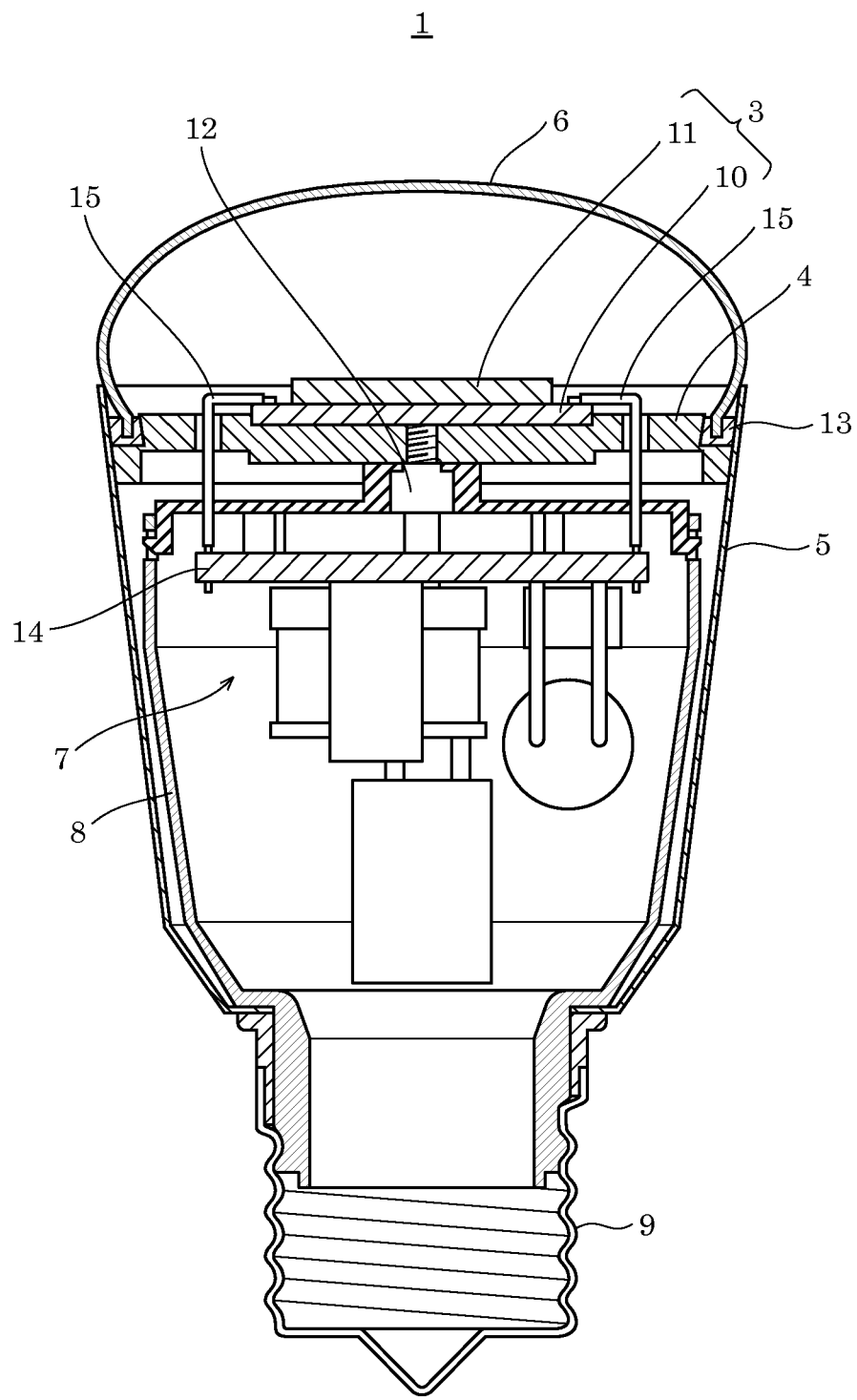
FIG. 2 is a cross-sectional view of the LED lamp according to the first exemplary embodiment.

FIG. 2 is a cross-sectional view showing a configuration of LED lamp 1 according to the first exemplary embodiment. LED lamp 1 is an LED lamp connectable to an external switch for performing an ON-OFF operation and includes: LED module 3 including an LED as a light source; mount 4 on which LED module 3 is mounted; case 5 having one end at which mount 4 is disposed; and glove 6 covering LED module 3. LED lamp 1 further includes: lighting circuit 7 which causes the LED to emit light, circuit holder 8 which stores lighting circuit 7 therein and is disposed in case 5; and base component 9 disposed at the other end of case 5.

LED module 3 is an example of the light emitting module, and includes: insulating substrate 10 on which an LED is mounted; the LED (not illustrated) mounted on insulating substrate 10; and sealant 11 which covers the LED above insulating substrate 10. Sealant 11 includes, for example, a translucent material and a wavelength converting material that converts a wavelength of light emitted from the LED into a predetermined wavelength. More specifically, sealant 11 includes a silicone resin including phosphor particles dispersed therein.

Mount 4 is a disk-shaped component having a material of high thermal conductivity. Mount 4 is coupled to circuit holder 8 by screw 12. An example of the material of high thermal conductivity which can be employed is a metal material such as aluminum. Mount 4 includes an outer circumference surface which is in contact with an inner circumference surface of case 5, and thus heat generated in LED module 3 is transmitted to case 5 via mount 4.

Case 5 is a cylindrical component including a material of high thermal emissivity. An example of the material of high thermal emissivity which can be employed is a metal material such as aluminum. Circuit holder 8 is housed inside case 5.

Glove 6 is fitted in a groove that is defined as a result of combining mount 4 and case 5, and adhesive 13 is filled in the groove. With this, glove 6 is fixed to mount 4 and case 5.

Lighting circuit 7 includes various electronic components mounted on insulating substrate 14, and is fixed to an inner surface of circuit holder 8. An output terminal of lighting circuit 7 and an input terminal of LED module 3 are electrically connected to each other by line 15.

Circuit holder 8 comprises an insulating material. An example of the insulating material which can be employed is a synthetic resin (specifically, polybutylene terephthalate (PBT)).

Base component 9 is attached to a socket of the lighting equipment, and supplied with power via the socket. Specifically, Edison base can be employed. Base component 9 is fixed to circuit holder 8. Base component 9 and an input terminal of lighting circuit 7 are electrically connected to each other by a line.

[Circuit Configuration of LED Lamp 1 and LED Illumination Apparatus 100]

Figure 3:
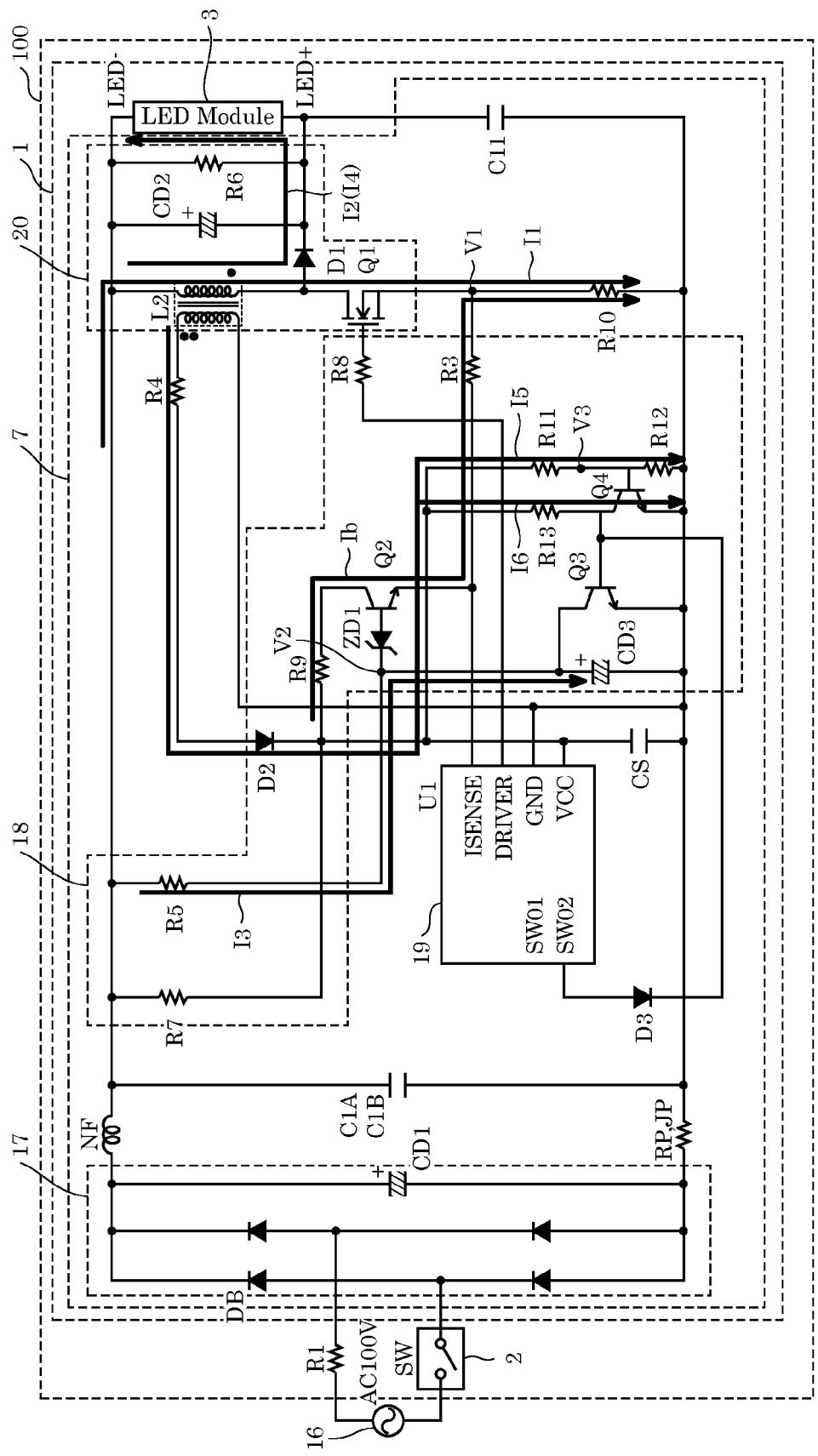
FIG. 3 is a circuit diagram of the LED illumination apparatus including the LED lamp according to the first exemplary embodiment.

FIG. 3 is a circuit diagram of LED illumination apparatus 100 including LED lamp 1 according to the first exemplary embodiment. LED illumination apparatus 100 includes: LED lamp 1 and external switch 2 connected to LED lamp 1. LED illumination apparatus 100 is supplied with power from external AC power supply 16 via external switch 2. LED lamp 1 is turned ON as a result of an ON operation performed on external switch 2 by a user, and turned OFF as a result of an OFF operation. An example of external switch 2 which can be employed is a wall switch. LED lamp 1 includes LED module 3 and lighting circuit 7 connected to LED module 3.

LED module 3 is connected to power supply circuit 20. LED module 3 is tuned ON by a current supplied from power supply circuit 20.

Lighting circuit 7 mainly includes: rectifying smoothing circuit 17 connected to external AC power supply 16 via external switch 2; timer circuit 18 supplied with DC power from rectifying smoothing circuit 17; and power supply circuit 20. Lighting circuit 7 further includes control circuit 19. Control circuit 19 controls power supply circuit 20 and performs an ON-OFF control on switching element Q3 in timer circuit 18.

Rectifying smoothing circuit 17 performs full-wave rectification on, and then smoothes into a DC voltage, an AC voltage supplied from external AC power supply 16.

Timer circuit 18 includes: resistance R5; capacitor CD3; Zener diodes ZD1; switching element Q2; and switching element Q3. Resistance R5 and capacitor CD3 are connected in series. Capacitor CD3 has one end connected to a terminal in a high voltage side of rectifying smoothing circuit 17 via resistance R5. Capacitor CD3 has the other end connected to a terminal in a low voltage side of rectifying smoothing circuit 17. Zener diodes ZD1 has a cathode connected to one end of capacitor CD3, and an anode connected to a base (control terminal) of switching element Q2. Capacitor CD3 and switching element Q3 are connected in parallel. Switching element Q3 has a base (control terminal) connected to control circuit 19. When switching element Q3 is ON, both ends of capacitor CD3 are short-circuited and capacitor CD3 is not charged in this state. As a result, timer circuit 18 is turned OFF (deactivated). In contrast, when switching element Q3 is OFF, capacitor CD3 starts to be charged, and timer circuit 18 is turned ON (activated). It is to be noted that switching elements Q2 and Q3 are in an OFF state in an initial state.

More specifically, timer circuit 18 includes: resistance R5 and capacitor CD3 which are connected in series, and are supplied with DC power from rectifying smoothing circuit 17; and switching element Q3 connected in parallel with capacitor CD3. The base (control terminal) of switching element Q3 is connected to control circuit 19, and receives an instruction from control circuit 19 to turn ON or OFF switching element Q3.

Control circuit 19 includes terminal VCC which receives power supply for running of control circuit 19. Control circuit 19 obtains an instruction related to an ON/OFF state of external switch 2 through terminal VCC. Control circuit 19 controls switches SW01 and SW02 in control circuit 19, according to the instruction. Switch SW01 in control circuit 19 issues an instruction to DRIVER in control circuit 19, and controls switching element Q1 by an output from a DRIVER terminal. Switch SW02 in control circuit 19 controls timer circuit 18 through switching element Q3. In addition, an ISENSE terminal in control circuit 19 monitors a voltage applied to resistance R10, and voltages applied to resistances R10 and resistance R3, in order to control a current flowing into switching element Q1. According to a result of the monitoring, control circuit 19 performs an ON-OFF control of switching element Q1 included in power supply circuit 20. Switching element Q1 and control circuit 19 which are sealed in one package may be employed. Power supply circuit 20 includes switching element Q1, inductor L2 which accumulates energy, and diode D1. LED module 3 is turned ON as a result of emitting energy accumulated in inductor L2. Power supply circuit 20 is a so-called DC-DC converter having a function of adjusting power supplied to LED module 3. Systems of the DC-DC converter include, for example, a single forward system, a flyback system, a push pull system, a half-bridge system, a full-bridge system, a mag amp system, a step-down chopper, system, a boosting chopper system, and a step-down and -up type chopper system. The step-down and -up type chopper system is employed in the first exemplary embodiment. However, any systems other than the step-down and -up type chopper system may be employed.

[Lighting Mode]

In the first exemplary embodiment, a normal external switch 2 as illustrated in FIG. 1 is employed. It is possible to set two modes according to how to turn the switch of external switch 2.

Figure 4A:
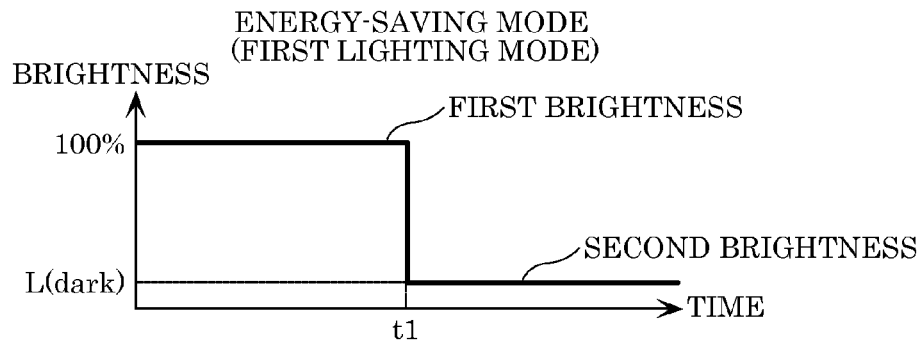
FIG. 4A is a diagram illustrating a relationship between brightness and time in an energy-saving mode of the LED lamp illustrated in FIG. 2.

The first lighting mode is referred to as an energy-saving mode, and is set when external switch 2 is initially turned ON. In the energy-saving mode, first, LED module 3 fully lights up (the first brightness: lighting at 100%), as illustrated in FIG. 4A. In the following description, the state in which LED module 3 fully lights up is referred to as a full lighting state. Subsequently, when predetermined time period t1 passes, LED module 3 emits light at night-light brightness L (the second brightness: dark) (hereinafter referred to as a night-light lighting state).

LED illumination apparatus 100, according to the energy-saving mode, is capable of exerting a function of preventing neglecting to turn off light in such a place as a toilet to stay in for just a short amount of time. In other words, it is possible to save power by employing LED illumination apparatus 100. In addition, LED module 3 emits light at the night-light brightness even when the operation of timer circuit 18 ends while someone stays in for a long time, and it is thus possible for a user to easily find a switch. In addition, there is an advantage of the energy-saving mode that it is possible, by setting the energy-saving mode before going to bed, to use LED illumination apparatus 100 in stairs or a hallway at night with low power as a night-light for use at night after timer circuit 18 is turned OFF.

It is to be noted that predetermined time period t1 taken before timer circuit 18 is turned OFF is preferably from 1 minute to 15 minutes inclusive, and more preferably from 5 minutes to 10 minutes inclusive. The reason why 1 minute or longer are preferable is that at least 1 minute or longer are considered to be necessary for use in such a place as a toilet. The reason why 15 minutes or shorter are preferable is that lighting for 15 minutes are considered to be sufficient because such a place as a toilet is not the place to stay in for a long time. In addition, brightness L in the night-light lighting state (the second brightness: dark), when the first brightness is assumed to be 100%, preferably ranges from at least 5% to at most 50%, and more preferably ranges from at least 5% to at most 30%. The reason why at least 5% are preferable is to ensure visibility of a person. The reason why at most 50% are preferable is that it falls within a range of brightness of which power saving and visibility are well-balanced.

Figure 4B:
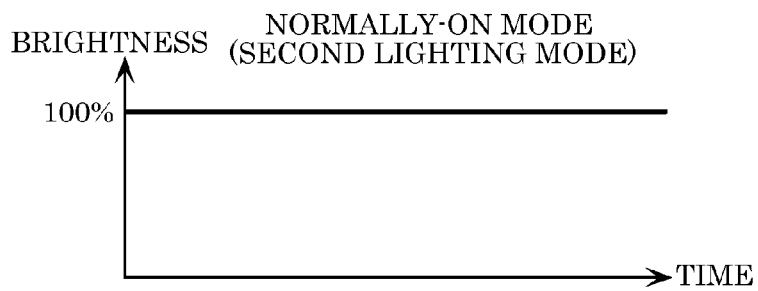
FIG. 4B is a diagram illustrating a relationship between brightness and time in a normally-on mode of the LED lamp illustrated in FIG. 2.

The second lighting mode is referred to as a normally-on mode. The normally-on mode is set when external switch 2 is turned OFF once and then turned ON again within 3 seconds, during a period from the start of the energy-saving mode to a time when timer circuit 18 is turned OFF. In the normally-on mode, LED module 3 is in the full lighting state when external switch 2 is ON, as illustrated in FIG. 4B.

As described above, the mode is switchable from the energy-saving mode to the normally-on mode, and thus an advantageous effect is produced as described below. For a general use of a toilet, external switch 2 is turned ON once to set the energy-saving mode. However, there are cases, for example, when it is necessary to use a toilet for a long time, or when cleaning of the toilet is necessary. In these cases, the mode can be readily changed to the normally-on mode merely by switching external switch 2 from ON to OFF, and to ON within 3 seconds, thereby producing high convenience. In addition, a switch which is widely used indoors can be employed as external switch 2, making external switch 2 be familiar to people. For that reason, children and elderly people can use the switch without a sense of discomfort. In addition, it is possible to use an external switch as it is, which is currently used indoors, by merely replacing a currently-used incandescent lamp or LED lamp with LED lamp 1 in LED illumination apparatus 100. For that reason, a user can use LED lamp 1 without wiring inside a wall.

It is to be noted that, a time period from when external switch 2 is turned OFF once and then turned ON again for setting the mode to the normally-on mode after entering the energy-saving mode is preferably within 3 seconds, and more preferably from 0.1 seconds to 3 seconds inclusive. The reason why 3 seconds or shorter are preferable is that the longer the time period before switching is, the longer the time period takes before timer circuit 18 is reset.

In addition, although the brightness until the end of predetermined time period t1 in the energy-saving mode or the brightness in the normally-on mode is the brightness of LED module 3 in the full lighting state in the first exemplary embodiment, the brightness is not limited to this.

[Switching of Lighting Mode]

The following describes switching of the lighting mode with reference to FIG. 5. FIG. 5 is a schematic diagram illustrating the state of the external switch of the LED illumination apparatus illustrated in FIG. 1. In the diagram, (a) OFF state, (b) ON state, (c) OFF state switched from the state (b), and (d) ON state switched within 3 seconds from the state (c) are illustrated.

As illustrated in FIG. 5, LED lamp 1 enters the energy-saving mode as a result of user's operation of changing external switch 2 from (a) OFF state to (b) ON state. For switching LED lamp 1 to the normally-on mode, the user changes external switch 2 from the state of (b) to the OFF state of (c), and then to the ON state of (d) within 3 seconds.

Figure 4C:
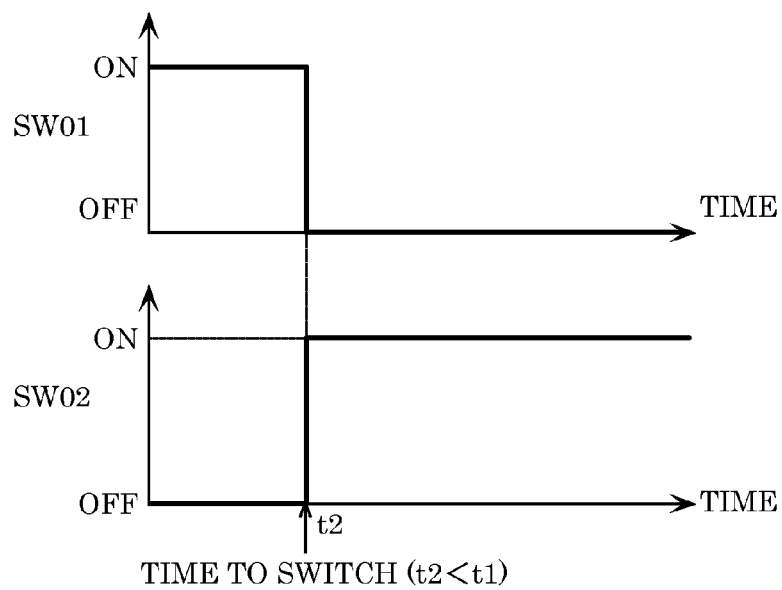
FIG. 4C is a diagram illustrating an ON/OFF state of switches SW01 and SW02 of a control circuit when the LED lamp illustrated in FIG. 2 is switched from the energy-saving mode to the normally-on mode.

The following describes a correspondence relationship between the switching of external switch 2, and switches SW01 and SW02 of control circuit 19 in lighting circuit 7. FIG. 6 illustrates a correspondence relationship between ON/OFF of external switch 2, the lighting modes, and ON/OFF of SW01 and SW02 in control circuit 19. In the energy-saving mode, SW01 is ON, and SW02 is OFF. In the normally-on mode, SW01 is OFF, and SW02 is ON. FIG. 4C shows the ON state and the OFF state of SW01 and SW02 at the end of time period t2 when the mode is switched from the energy-saving mode to the normally-on mode. Time period t2 at the end of which the mode is switched is shorter than time period t1 at the end of which the operation of timer circuit 18 ends.

[Operation of Control Circuit 19]

Figure 7:
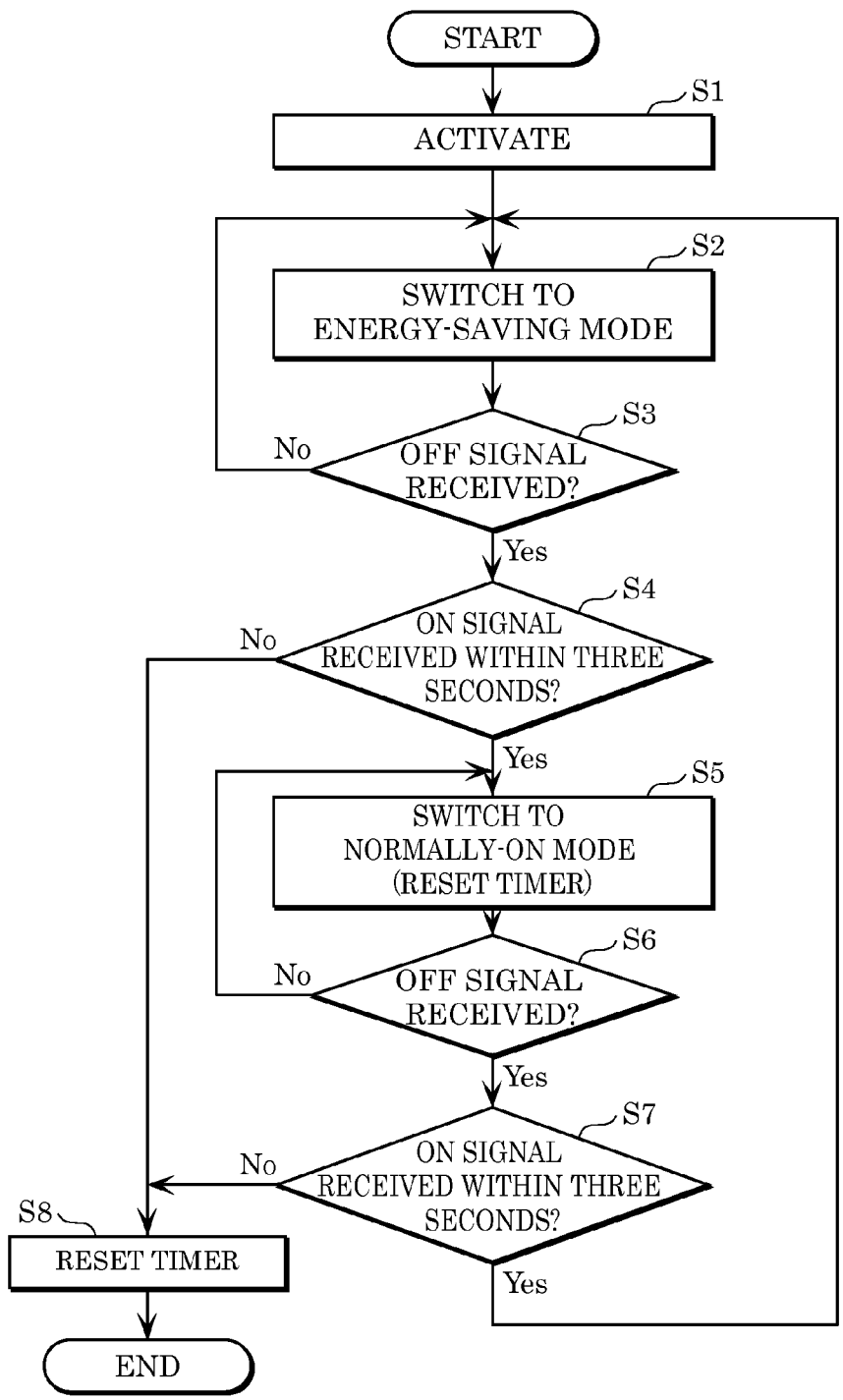
FIG. 7 is a flowchart of the control circuit of the LED illumination apparatus according to the first exemplary embodiment.

FIG. 7 is a flowchart of an operation of control circuit 19. The flow starts in response to a user's first operation of turning ON external switch 2. When external switch 2 is turned ON, a power supply voltage of control circuit 19 which is provided from terminal VCC in control circuit 19 increases, thereby activating control circuit 19 in Step S1. This turns SW01 ON and SW02 OFF in control circuit 19, thereby switching the mode to the energy-saving mode in Step S2. In other words, control circuit 19 causes light emitting module 3 to emit light in the first lighting mode when external switch 2 is turned ON while light emitting module 3 is in an OFF state.

Timer circuit 18 is turned ON in the early stage of the energy-saving mode. Subsequently, control circuit 19 receives an OFF signal from external switch 2 (Step S3: Yes), and it is assumed that control circuit 19 receives an ON signal from external switch 2 within 3 seconds after external switch 2 is turned OFF (Step S4: Yes). In this case, the mode switches to the normally-on mode in Step S5. In other words, control circuit 19 changes the first lighting mode to the second lighting mode when external switch 2 is turned ON within 3 seconds after external switch 2 is turned OFF before timer circuit 18 is deactivated.

In Step S5, SW01 is turned OFF and SW02 is turned ON in control circuit 19, and thus timer circuit 18 is reset. If Step S3 results in No, the energy-saving mode is maintained. If Step S4 results in No, timer circuit 18 is reset in Step S8, LED module 3 is turned OFF, and the flow ends. After the mode has switched to the normally-on mode in Step S5, control circuit 19 receives an OFF signal from external switch 2 (Step S6: Yes), and it is assumed that control circuit 19 receives an ON signal from external switch 2 within 3 seconds after external switch 2 is turned OFF (Step S7: Yes). In this case, the mode returns to the energy-saving mode in the first exemplary embodiment. In other words, if Step S7 results in Yes, SW01 is turned ON and SW02 is turned OFF. More specifically, control circuit 19 changes the second lighting mode to the first lighting mode when external switch 2 is turned ON within 3 seconds after external switch 2 is turned OFF.

If Step S6 results in No, the normally-on mode is maintained. If Step S7 results in No, timer circuit 18 is reset in Step S8, LED module 3 is turned OFF, and the flow ends.

[Operation of Each Mode]

Figure 8:
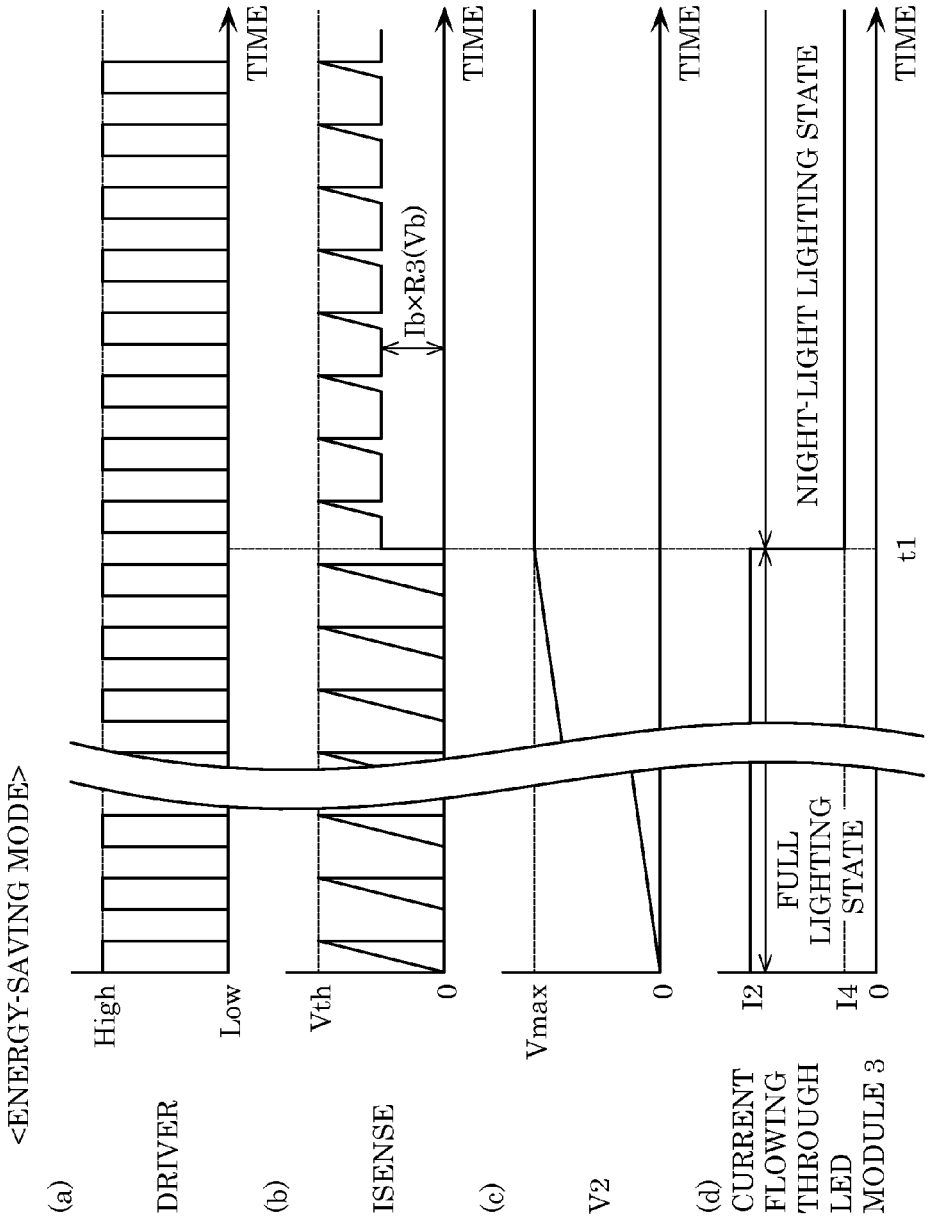
FIG. 8 illustrates (a) a timing chart showing an output voltage (High, Low) from a DRIVER terminal in the control circuit, (b) a timing chart showing a monitoring state of an ISENSE terminal in the control circuit, (c) a timing chart showing a value of voltage V2 in a timer circuit, and (d) a timing chart showing a value of a current flowing through an LED module, all of which are in the energy-saving mode of the LED lamp illustrated in FIG. 2.
Figure 9:
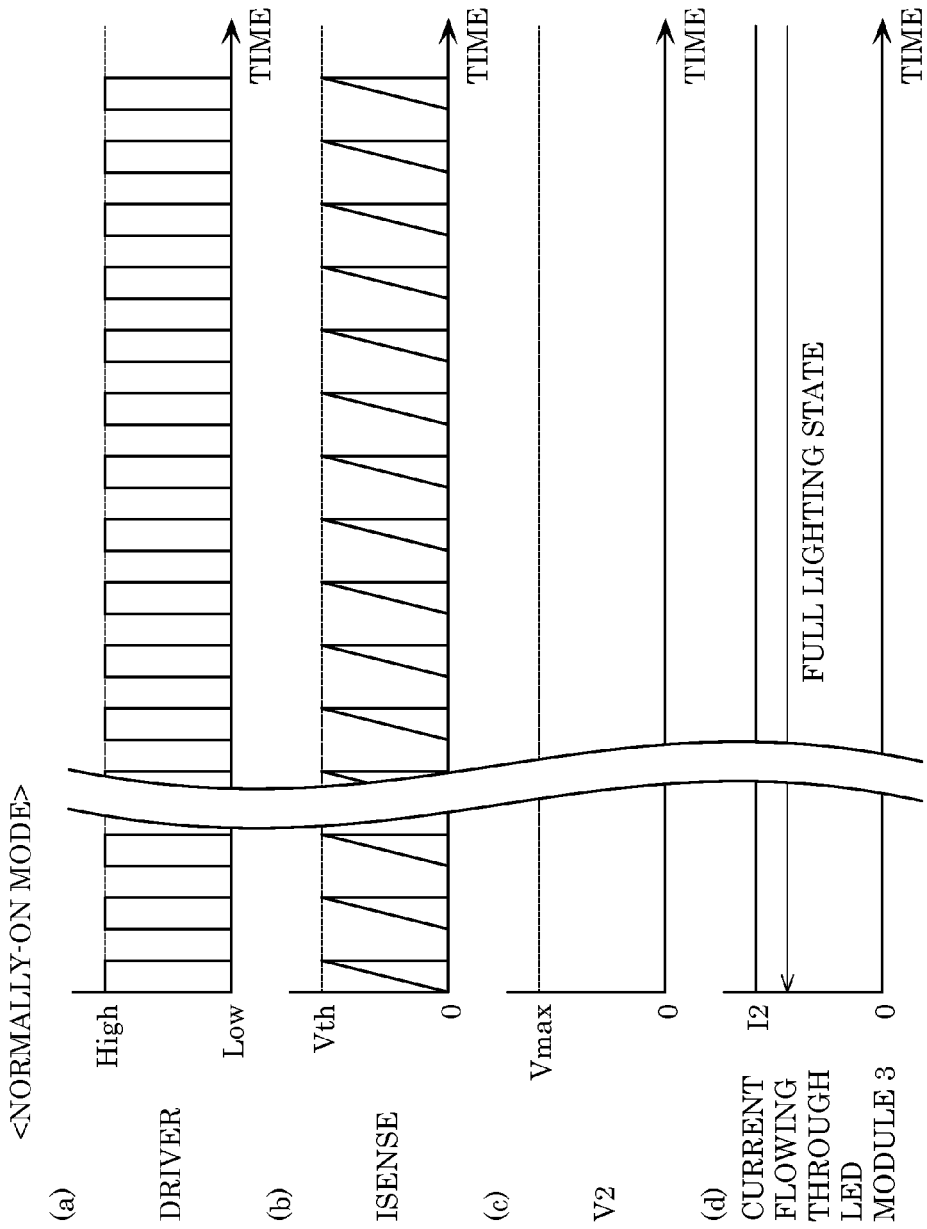
FIG. 9 illustrates (a) a timing chart showing an output voltage (High, Low) from the DRIVER terminal in the control circuit, (b) a timing chart showing a monitoring state of the ISENSE terminal in the control circuit, (c) a timing chart showing a value of voltage V2 in the timer circuit, and (d) a timing chart showing a value of a current flowing through the LED module, all of which are in the normally-on mode of the LED lamp illustrated in FIG. 2.

The following describes operations of the energy-saving mode and the normally-on mode with reference to the circuit diagram of FIG. 3, FIG. 8, and FIG. 9.

(1) Energy-saving Mode (the First Lighting Mode)

First, the energy-saving mode which is the first lighting mode will be described. FIG. 8 illustrates (a) a timing chart showing an output voltage (High, Low) from the DRIVER terminal in control circuit 19, (b) a timing chart showing a monitoring state of the ISENSE terminal in control circuit 19, (c) a timing chart showing a value of voltage V2 in timer circuit 18, and (d) a timing chart showing a value of a current flowing through LED module 3, all of which are in the energy-saving mode.

When external switch 2 is initially turned ON, SW01 is turned ON and SW02 is turned OFF in control circuit 19. Then, a voltage (High) for turning ON switching element Q1 is outputted from the DRIVER terminal of control circuit 19. As illustrated in (a) in FIG. 8, the output voltage from the DRIVER terminal repeatedly changes between High and Low at a constant frequency. When a High signal is outputted from the DRIVER terminal, switching element Q1 is turned ON. As a result, current I1 flows from a terminal in a high voltage side of rectifying smoothing circuit 17, through inductor L2, switching element Q1, and resistance R10, to a terminal in a low voltage side of rectifying smoothing circuit 17.

As current I1 increases, voltage V1 applied to resistance R10 increases. As shown in (b) in FIG. 8, voltage V1 is monitored by the ISENSE terminal of control circuit 19. When voltage V1 reaches threshold voltage Vth of ISENSE, a voltage (Low) for turning OFF switching element Q1 is outputted from the DRIVER terminal, and switching element Q1 is turned OFF. Then, energy accumulated in inductor L2 is emitted, and current I2 flows into LED module 3. At this time, LED module 3 fully lights up as illustrated in (d) in FIG. 8.

By the way, switching elements Q2 and Q3 are in an OFF state in an initial state. Thus, when external switch 2 is initially turned ON, current I3 flows from a terminal in a high voltage side of rectifying smoothing circuit 17, through resistance R5 and capacitor CD3, to a terminal in a low voltage side of rectifying smoothing circuit 17. Capacitor CD3 is charged with current I3. The time when capacitor CD3 starts to be charged is the time (t=0) when timer circuit 18 is turned ON.

As illustrated in (c) in FIG. 8, voltage V2 applied to capacitor CD3 increases, as charging of capacitor CD3 proceeds. When voltage V2 reaches breakdown voltage Vmax of Zener diodes ZD1, Zener diodes ZD1 is brought into conduction and switching element Q2 is turned ON. Timer circuit 18 is turned OFF at the end of time period t1.

When timer circuit 18 is turned OFF, current Ib flows from the terminal in a high voltage side of rectifying smoothing circuit 17, through resistance R9, switching element Q2, resistance R3, and resistance R10, to a terminal in a low voltage side of rectifying smoothing circuit 17. Current Ib flowing to resistance R9 is calculated as follows: Ib=(voltage provided from VCC)/(R9+R3+R10). Accordingly, after the end of time period t1 when timer circuit is turned OFF (night-light lighting state), the ISENSE terminal of control circuit 19 is applied with a voltage (Vb+V1) resulting from superimposing Ib×R3 (defined as voltage Vb) to voltage V1 applied to resistance R10. Thus, the time period from when switching element Q1 is turned ON to when ISENSE reaches Vth in the night-light lighting state is shorter than that in the full lighting state, as illustrated in (b) in FIG. 8. As a result, energy accumulated in inductor L2 in the night-light lighting state is lower than that in the full lighting state. Then, current I4 (<I2) flows into LED module 3, and LED module 3 emits light in the night-light lighting state as illustrated in (d) in FIG. 8.

(2) Normally-on Mode (the Second Lighting Mode)

Next, the normally-on mode which is the second lighting mode will be described. FIG. 9 illustrates (a) a timing chart showing an output voltage (High, Low) from the DRIVER terminal in control circuit 19, (b) a timing chart showing a monitoring state of the ISENSE terminal in control circuit 19, (c) a timing chart showing a value of voltage V2 in timer circuit 18, and (d) a timing chart showing a value of a current flowing through LED module 3, all of which are in the normally-on mode.

In the normally-on mode, SW01 is turned OFF and SW02 is turned ON in control circuit 19. Then, switching element Q3 is turned ON and current I3 flowing through resistance R5 flows through switching element Q3. Capacitor CD3 is not charged accordingly, and thus voltage V2 is always zero. More specifically, timer circuit 18 is not turned ON in the normally-on mode. In addition, switching element Q2 is not turned ON either. Thus, current I2 constantly flows into LED module 3 in the normally-on mode, and the full lighting state of LED module 3 is maintained.

(3) Timer Resetting Mode

In each of the energy-saving mode and the normally-on mode, the mode enters a timer resetting mode when a time period longer than 3 seconds passes after external switch 2 is turned OFF. The following describes the timer resetting mode with reference to FIG. 3. Since power supply from external AC power supply 16 stops when a time period longer than 3 seconds passes after external switch 2 is turned OFF, the power supply voltage in control circuit 19 which is provided from terminal VCC starts to decrease. At this time, voltage V3 applied to resistance R12 is calculated as follows: V3=(voltage provided from VCC)×R12/(R11+R12 ). Base-emitter voltage Vbeon which turns ON switching element Q4 is approximately 0.6 V and is lower than voltage V3. Thus, switching element Q4 is turned ON. Then, current I6 flows into resistance R13 and switching element Q4.

Current I6 continues to flow and voltage Vbeon thereby increases to be higher than voltage V3, and thus a current stops flowing through resistances R11 and R12. Then, switching element Q4 is turned OFF. When switching element Q4 is turned OFF, the base voltage of switching element Q3 increases and switching element Q3 is turned ON. As a result, capacitor CD3 is discharged, and timer circuit 18 is reset (t=0).

As described above, it is possible to reset timer circuit 18 simply when a time period longer than 3 seconds passes after external switch 2 is turned OFF. More specifically, when a time period longer than 3 seconds passes after external switch 2 is turned OFF, control circuit 19 resets timer circuit 18. It is thus possible to set the energy-saving mode in which timer circuit 18 operates for the same predetermined time period t1 any number of times, unless external switch 2 is turned ON again within 3 seconds after having been turned OFF.

In addition, Q3 is turned ON as well when SW02 becomes High, and timer circuit 18 is reset.

Here, the operation of LED lamp 1 will be summarized as below. It is possible to use LED lamp 1 being connected to external switch 2 for performing an ON-OFF operation. LED lamp 1 includes light emitting module 3 and power supply circuit 20 which supplies a current to light emitting module 3. LED lamp 1 further includes timer circuit 18 and control circuit 19 that determines, based on the ON-OFF operation performed by external switch 2, whether to cause light emitting module 3 to emit light in the first lighting mode or to cause light emitting module 3 to emit light in the second lighting mode, and controls power supply circuit 20. When light emitting module 3 is caused to emit light in the first lighting mode, timer circuit 18 is turned ON in the early stage of the first lighting mode. When light emitting module 3 is caused to emit light in the first lighting mode, control circuit 19 causes light emitting module 3 to emit light at the first brightness, by controlling power supply circuit 20, until predetermined time period t1 passes after timer circuit 18 is turned ON (activated). Control circuit 19 controls power supply circuit 20 to cause light emitting module 3 to emit light at the second brightness which is lower than the first brightness, after passage of predetermined time period t1. Control circuit 19 causes light emitting module 3 to continue to emit light at the first brightness irrespective of the state of timer circuit 18, when light emitting module 3 is caused to emit light in the second lighting mode.

LED lamp 1 can automatically be switched from a blight state (the first brightness) to a dark state (the second brightness) by timer circuit 18 when activated in response to an ON operation performed on external switch 2 by a user (energy-saving mode: the first lighting mode). LED lamp 1 is capable of maintaining the bright state merely by the operation of external switch 2 (normally-on mode: the second lighting mode). With LED lamp 1, it is possible to realize power saving without a human sensor. Furthermore, it is possible to obtain the normally-on state when lighting is required for a long time period.

[Modification of the First Exemplary Embodiment]

Figure 10:
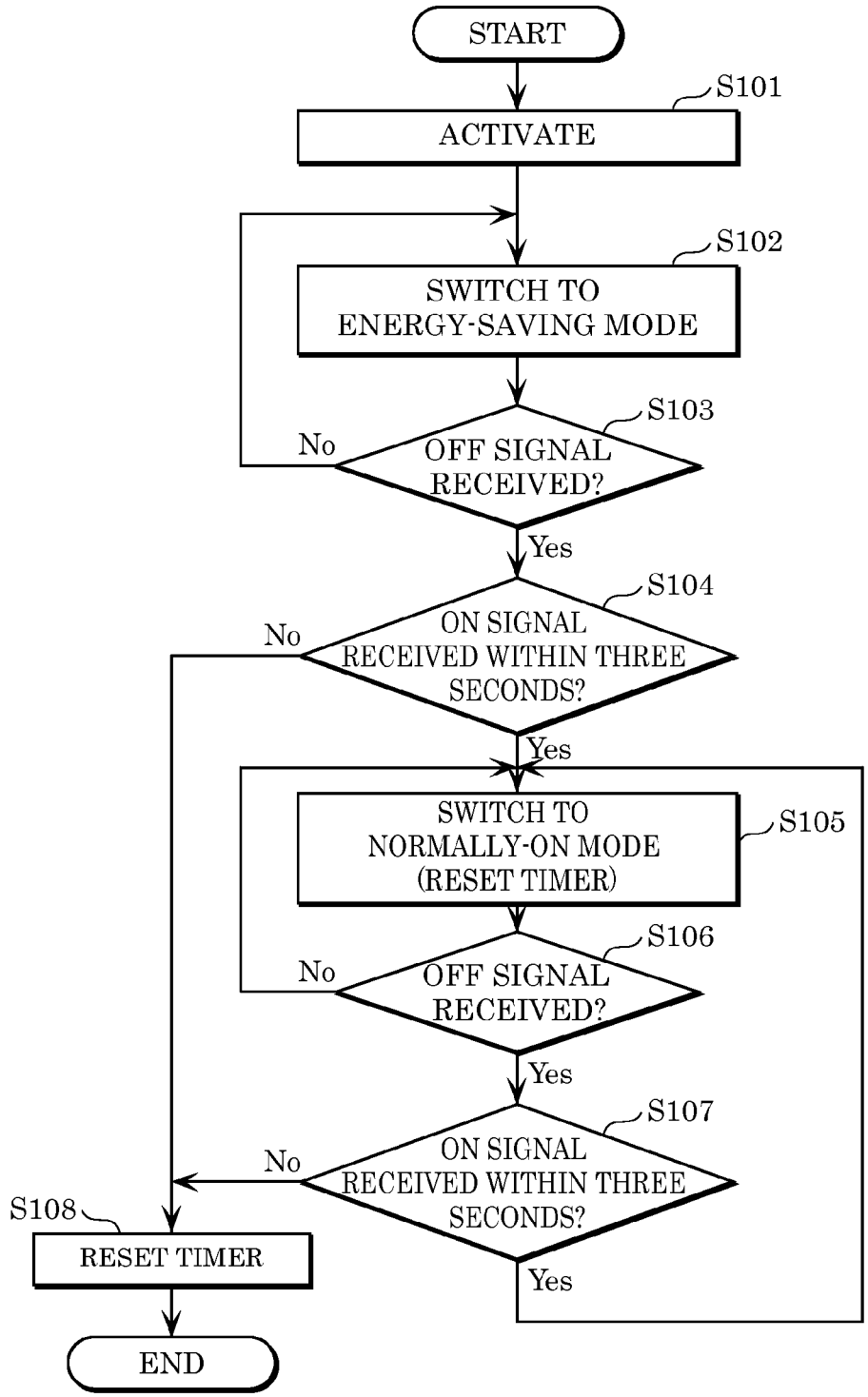
FIG. 10 is a flowchart of the control circuit of the LED illumination apparatus according to a modification example of the first exemplary embodiment.

FIG. 10 is a flowchart of an operation of a control circuit in an LED illumination apparatus according to a modification example of the first exemplary embodiment. The mode is switched to the energy-saving mode when Step S7 results in Yes according to the first exemplary embodiment. In contrast, the mode is switched to the normally-on mode when Step S107 results in Yes according to the modification example. More specifically, excepting the case where Step S107 results in Yes, operations from Step S101 to Step S108 in the modification example are the same as the operations of control circuit 19 from Step S1 to Step S8 in the first exemplary embodiment.

The mode is switched to the normally-on mode when Step S107 results in Yes according to the modification example. In other words, if Step S107 results in Yes, SW01 is turned OFF and SW02 is turned ON. In sum, control circuit 19 maintains the second lighting mode when external switch 2 is turned ON within 3 seconds after external switch 2 is turned OFF.

With this, it is possible to switch the mode to the normally-on mode (to maintain the normally-on mode) by turning ON external switch 2 within 3 seconds after tuning OFF external switch 2 in the normally-on mode. It is thus possible to reset to the normally-on mode by turning ON external switch 2 within 3 seconds even when external switch 2 is accidentally tuned OFF in the normally-on mode.

[Second Exemplary Embodiment]

Figure 11:
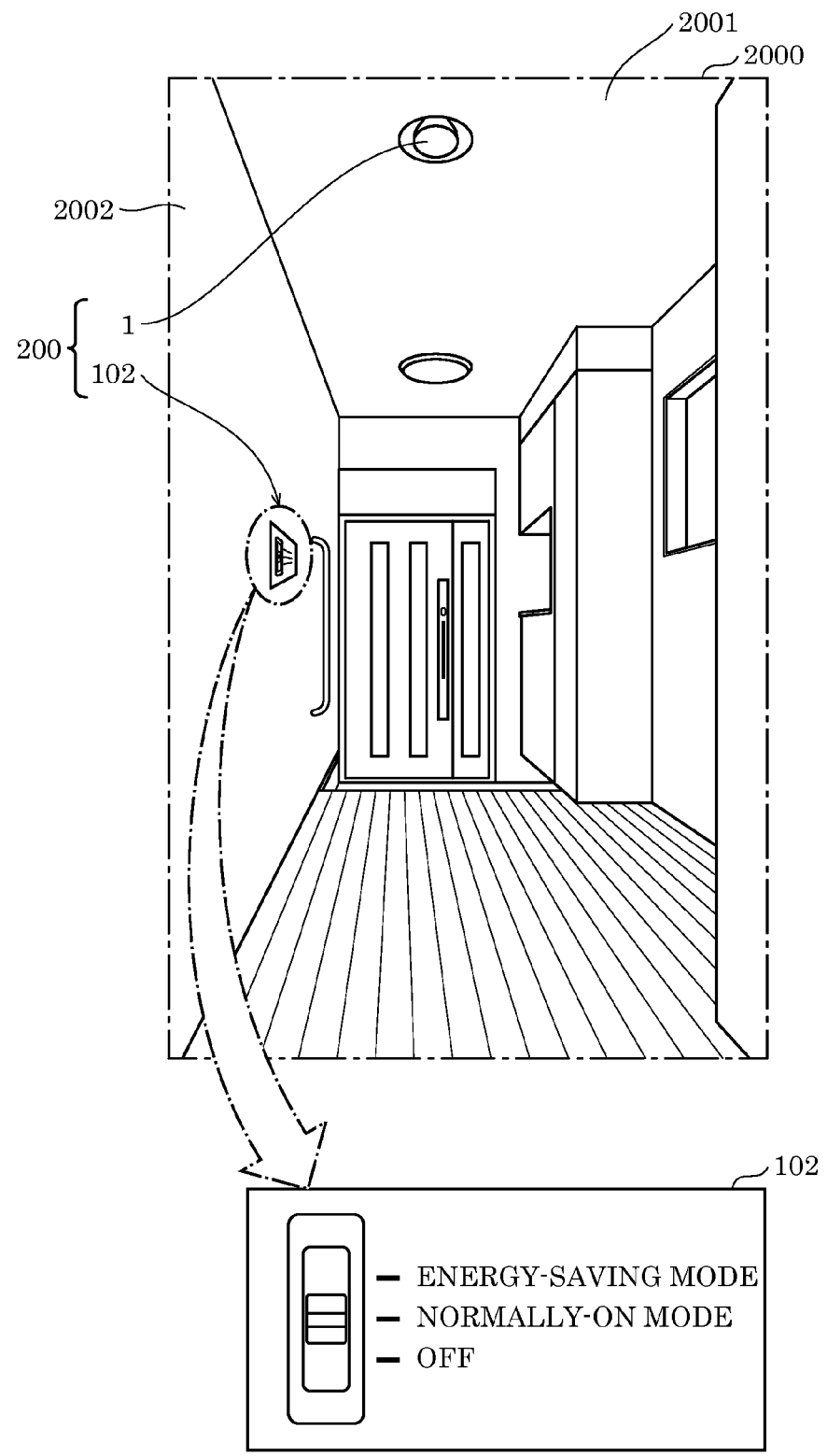
FIG. 11 is a schematic diagram illustrating an LED illumination apparatus according to a second exemplary embodiment.

FIG. 11 illustrates LED illumination apparatus 200 according to a second exemplary embodiment. LED illumination apparatus 200 includes: LED lamp 1 provided on ceiling 2001 of hallway 2000 extending from an entrance; and external switch 102 provided on wall 2002 of hallway 2000. External switch 102 is not a wall switch as described in the first exemplary embodiment, but a sliding switch which indicates a current state of LED illumination apparatus 200. The mode to be switched in first from an OFF state is the normally-on mode, and the mode to be switched in next is the energy-saving mode.

Figure 12:
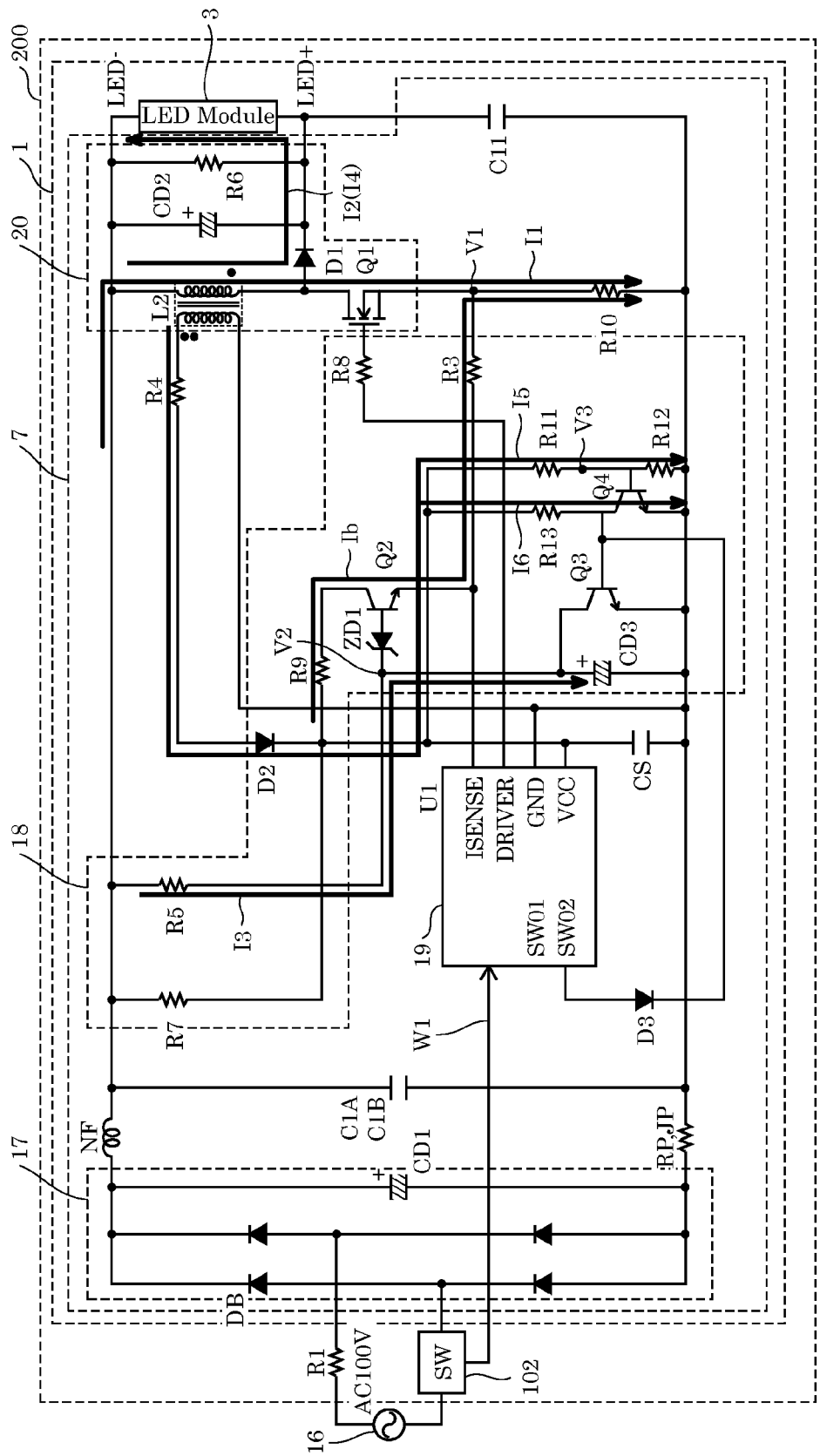
FIG. 12 is a circuit diagram illustrating the LED illumination apparatus according to the second exemplary embodiment.

FIG. 12 illustrates a circuit diagram of LED illumination apparatus 200 according to the second exemplary embodiment. LED illumination apparatus 200 differs from LED illumination apparatus 100 of the first exemplary embodiment in that the sliding switch is provided, as external switch 102, instead of the wall switch, and that a signal from external switch 102 directly enters control circuit 19. A signal from external switch 102 enters control circuit 19 through line W1. Other than that described above, the configuration of LED illumination apparatus 200 is the same as the configuration of LED illumination apparatus 100.

It is possible for a user to visually recognize the current mode easily, by employing the sliding switch as external switch 102. With LED illumination apparatus 100, the user who operates external switch 2 knows the current mode, but other people cannot know the current mode.

The mode to be switched initially is set to the normally-on mode in LED illumination apparatus 200, and thus LED illumination apparatus 200 is advantageous when provided in such places as an entrance and a hallway through which a user often passes. For example, an illuminating lamp in the hallway is always ON, in general, from the evening to the time a person goes to a bedroom. It is possible to prevent neglecting to turn off LED lamp 1, by setting the energy-saving mode for a predetermined time period before a user goes to the bedroom. In addition, LED lamp 1 is switched to the night-light lighting state after passage of a predetermined time period in the energy-saving mode, and thus it is possible to prevent the case where a user who passes through the hallway late at night gets an injury by bumping into a wall, a step, etc. Timer circuit 18 is reset by tuning OFF and leaving LED lamp 1, after dawn. By the reset, LED lamp 1 is set again to the energy-saving mode in which the operation of timer circuit 18 ends at the end of the same predetermined time period.

[Modification of the Second Exemplary Embodiment]

Figure 13:
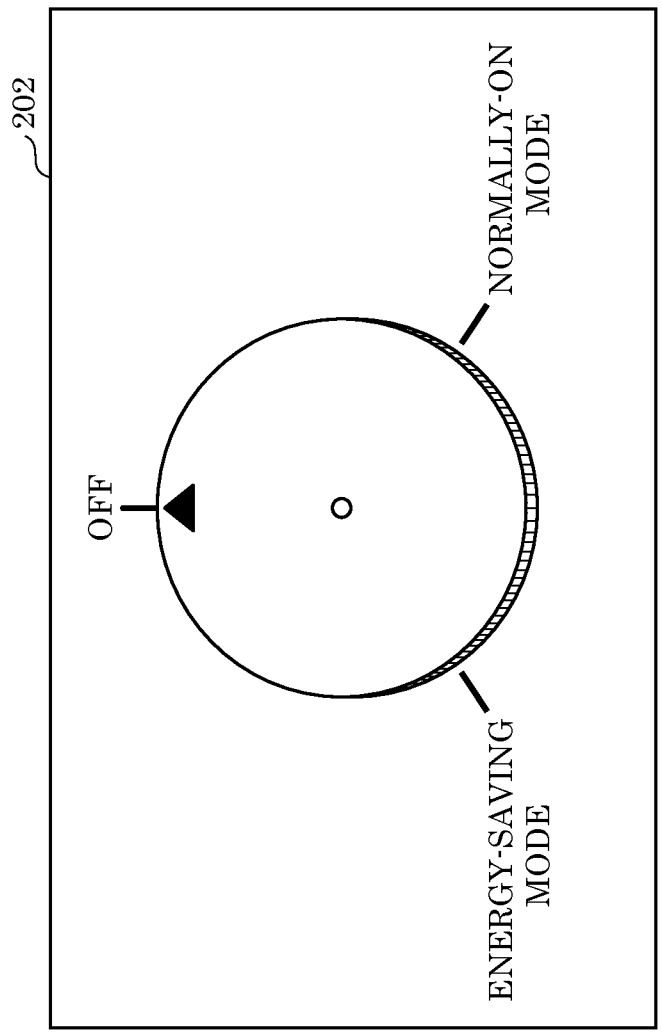
FIG. 13 is a schematic diagram illustrating the external switch of the LED lamp according to a modification example of the second exemplary embodiment.

FIG. 13 illustrates external switch 202 of LED illumination apparatus 200 according to a modification example of the second exemplary embodiment. External switch 202 is not the sliding switch but a dial switch. The mode to be switched initially from an OFF state can be readily switched between the energy-saving mode and the normally-on mode merely by turning a dial to the left or right. Other than external switch 202, the configuration of LED illumination apparatus 200 according to the modification example of the second exemplary embodiment is the same as the configuration described in the second exemplary embodiment.

It is possible not only to visually recognize the current mode but to switch the mode from OFF to the energy-saving mode or to the normally-on mode by a single dial operation, by employing the dial switch as external switch 202. This reduces complication of switching between the modes compared to external switch 102 according to the second exemplary embodiment.

[Other Modifications]

As another modification example, a button switch may be employed as a switch of the LED illumination apparatus. In this modification example, three buttons respectively indicating "OFF", "energy-saving mode", and "normally-on mode" are included. Switching between the modes can be operated just by pressing the buttons, and thus operability increases.

In addition, not the button switch but a touch panel switch may be employed. In this modification example, icons respectively indicating "OFF", "energy-saving mode", and "normally-on mode" are displayed on a touch panel to switch between the modes merely by touching the icons, and thus operability increases.

[Others]

The following configurations can also be applied to the above-described exemplary embodiments and modification examples.

(1) The wall switch is a collective term indicating switches capable of only switching between ON and OFF, and not limited to the switch attached to a wall. For example, the wall switch may be a switch attached to a cable extending from a ceiling or a wall. In addition, the LED lamp and each of the switches employed in the above-described exemplary embodiments and modification examples may be connected by wired or wireless connection.

(2) The LED module including an LED as a light source is employed in the light emitting module, however, the light emitting module is not limited to the light emitting module including an LED as a light source. For example, a light emitting module including an LD (laser diode), an EL (electroluminescence), etc. as the light source may be employed.

(3) LED lamp 1 is set to enter the energy-saving mode, however the mode to initially enter is not limited to the energy-saving mode. LED lamp 1 may be set to initially enter the normally-on mode.

(4) An analog timer circuit is employed as timer circuit 18, however, timer circuit 18 is not limited to the analog timer circuit. A digital clock timer circuit may be employed as timer circuit 18.

(5) The first brightness in the energy-saving mode may be the brightness specified in rating of the LED lamp. For example, 810 lm is specified in the case of a 60 W type LED light bulb, and 485 lm is specified in the case of a 40 W type LED light bulb. It is to be noted that each of the first brightness and the second brightness means a total luminous flux, and the unit is a lumen (lm).

(6) The brightness of the full lighting state in the energy-saving mode and the brightness in the normally-on mode are described as the same brightness, however, the brightness is not limited to this. The brightness of the full lighting state in the energy-saving mode and the brightness in the normally-on mode may be different.

(7) In the energy-saving mode, it is prerequisite to shift to the night-light lighting state after passage of a predetermined time period, however, it is not limited to shifting to the night-light lighting state. The state may be shifted to a full OFF state after passage of a predetermined time period.

(8) The human sensor consumes standby electricity even when not detecting a human. In order to suppress power consumption to the level lower than or equal to the power consumption of the standby electricity, the brightness may be set to a brightness lower than or equal to the brightness in the night-light lighting state, after passage of a predetermined time period in the energy-saving mode. More specifically, the second brightness in the energy-saving mode may range from at least 0% to at most 5% when the first brightness is 100%.

(9) The external switch is the ON state in the energy-saving mode and the normally-on mode.

(10) The LED illumination apparatus according to the present discloser is suitable to be installed in a place where a person temporarily stays, such as a toilet, a hallway, and stairs.

(11) The LED lamp and the illumination apparatus according to the present discloser may each have a configuration including arbitrarily combined partial configurations of the exemplary embodiments. The present discloser may generally be applied widely to LED lamps and LED illumination apparatuses.

What is claimed is:

1. An LED (Light Emitting Diode) lamp to be connected to an external switch for performing an ON-OFF operation, the LED lamp comprising:
   a light emitting module;
   a power supply circuit which supplies a current to the light emitting module and which has an inductor connected the light emitting module in parallel;
   a control circuit which determines whether to cause the light emitting module to emit light in a first lighting mode or to cause the light emitting module to emit light in a second lighting mode, based on the ON-OFF operation performed by the external switch, and controls the power supply circuit;

a timer circuit which is activated in an early stage of the first lighting mode the timer circuit including a first switching element and a first resistor;

a rectifying smoothing circuit connected to an external AC power supply connected via the external switch; and the first switching element, the first resistor, and a second resistor are connected in series from a high voltage side of the rectifying smoothing circuit to a low voltage side of the rectifying smoothing circuit, wherein the control circuit:

includes an ISENSE terminal configured to monitor a voltage applied to the first resistor, and further configured to monitor voltages applied to the first resistor and the second resistor, in the first lighting mode, controls the power supply circuit to cause the light emitting module to emit light at a first brightness for a predetermined time period from when the timer circuit is activated, and to cause the light emitting module to emit light at a second brightness after passage of the predetermined time period by a voltage superimposed on the ISENSE terminal, the voltage applied to the first resistor, and the voltage induced by a current flowing in the first resistor due to the first switching element being turned ON, and in the second lighting mode, controls the power supply circuit to cause the light emitting module to continue to emit light at the first brightness irrespective of a state of the timer circuit, the second brightness being lower than the first brightness.

2. The LED lamp according to claim 1,
wherein the second brightness ranges from at least 5% to at most 50% when the first brightness is 100%.

3. The LED lamp according to claim 1,
wherein the predetermined time period is from 1 minute to 15 minutes inclusive in the first lighting mode.

4. The LED lamp according to claim 1,
wherein the timer circuit is deactivated after passage of the predetermined time period in the first lighting mode.

5. The LED lamp according to claim 1,
wherein the timer circuit includes: a third resistor and a capacitor which are connected in series and are supplied with DC power from the rectifying smoothing circuit; and a second switching element connected in parallel to the capacitor, and
wherein the second switching element includes a control terminal connected to the control circuit and is turned ON or OFF in response to an instruction provided from the control circuit to the control terminal.

6. The LED lamp according to claim 1,
wherein the control circuit causes the light emitting module to emit light in the first lighting mode when the external switch is turned ON while the light emitting module is in an OFF state.

7. The LED lamp according to claim 4,
wherein the control circuit changes the first lighting mode to the second lighting mode when the external switch is turned ON within 3 seconds after the external switch is turned OFF before the timer circuit is deactivated.

8. The LED lamp according to claim 7,
wherein the control circuit changes the second lighting mode to the first lighting mode when the external switch is turned ON within 3 seconds after the external switch is turned OFF.

9. The LED lamp according to claim 7,
wherein the control circuit maintains the second lighting mode when the external switch is turned ON within 3 seconds after the external switch is turned OFF.

10. The LED lamp according to claim 4,
wherein the control circuit resets the timer circuit when a time period longer than 3 seconds passes after the external switch is turned OFF.

11. An LED (Light Emitting Diode) illumination apparatus comprising:
an external switch configured to perform an ON-OFF operation, and
an LED lamp connected to the external switch, the LED lamp comprising:
a light emitting module;
a power supply circuit which supplies a current to the light emitting module, the power supply circuit having a inductor connected the light emitting module in parallel;
a control circuit which determines whether to cause the light emitting module to emit light in a first lighting mode or to cause the light emitting module to emit light in a second lighting mode, based on the ON-OFF operation performed by the external switch, and controls the power supply circuit;
a timer circuit which is activated in an early stage of the first lighting mode the timer circuit including a first switching element and a first resistor;
a rectifying smoothing circuit connected to an external AC power supply connected via the external switch; and
the first switching element, the first resistor, and a second resistor are connected in series from a high voltage side of the rectifying smoothing circuit to a low voltage side of the rectifying smoothing circuit, wherein:
the second resistor is connected to the inductor in series,
the control circuit includes an ISENSE terminal monitoring a voltage applied to the first resistor, and further monitoring voltages applied to the first resistor and the second resistor,
in the first lighting mode, the control circuit controls the power supply circuit to cause the light emitting module to emit light at a first brightness for a predetermined time period from when the timer circuit is activated, and to cause the light emitting module to emit light at a second brightness after passage of the predetermined time period by a voltage superimposed on the ISENSE terminal, the voltage applied to the first resistor, the voltage induced by a current flowing in the first resistor due to the first switching element being turned ON, and
in the second lighting mode, the control circuit controls the power supply circuit to cause the light emitting module to continue to emit light at the first brightness irrespective of a state of the timer circuit, the second brightness being lower than the first brightness.

12. The LED illumination apparatus according to claim 11,
wherein the external switch is one of a sliding switch and a dial switch each indicating the first lighting mode and the second lighting mode.

* * * * *